(12) United States Patent
Ling (10) Patent No.: US 10,613,221 B2
(45) Date of Patent: *Apr. 7, 2020

(54) SCALABLE ARCHITECTURE FOR AN AUTOMOTIVE RADAR SYSTEM

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,417

(22) Filed: Dec. 31, 2018

(65) Prior Publication Data

US 2019/0137623 A1 May 9, 2019

Related U.S. Application Data

(63) Continuation of application No. 15/150,669, filed on May 10, 2016, now Pat. No. 10,175,352.

(Continued)

(51) Int. Cl.
*G01S 13/93* (2020.01)
*G01S 7/00* (2006.01)
(Continued)

(52) U.S. Cl.
CPC ............ *G01S 13/931* (2013.01); *G01S 7/006* (2013.01); *G01S 7/4021* (2013.01);
(Continued)

(58) Field of Classification Search
CPC ...... G01S 13/931; G01S 7/006; G01S 7/4021; G01S 7/4026; G01S 13/0209;
(Continued)

(56) References Cited

U.S. PATENT DOCUMENTS 5,122,801 A * 6/1992 Hughes ................... G01S 7/021
342/13
5,410,314 A * 4/1995 Frush .................... G01S 13/003
342/26 D (Continued)

FOREIGN PATENT DOCUMENTS

WO  WO-2008081246 A2 * 7/2008 ............. H03F 3/211
WO  WO-2013024459 A1 * 2/2013 ........... H01Q 3/2605

*Primary Examiner* — Vladimir Magloire
*Assistant Examiner* — Nuzhat Pervin
(74) *Attorney, Agent, or Firm* — McAndrews, Held & Malloy (57) ABSTRACT

First transmitter circuitry communicates, via bus interface circuitry, on a data bus to detect whether any second transmitter circuitry is coupled to the data bus. In instances that no second transmitter circuitry is detected as being coupled to the data bus, the first transmitter circuitry transmits beamformed signals via a first plurality of antenna elements using beamforming coefficients. In instances that second transmitter circuitry is detected as being coupled to the data bus, the first transmitter circuitry determines a phase offset between clock generation circuitry of the first transmitter circuitry and clock generation circuitry of the detected second transmitter circuitry. The first transmitter circuitry compensates the beamforming coefficients based on the determined phase offset. The first transmitter circuitry use the compensated beamforming coefficients for transmitting signals that are phase coherent with signals transmitted by the second transmitter circuitry.

20 Claims, 11 Drawing Sheets

Related U.S. Application Data (60) Provisional application No. 62/160,316, filed on May 12, 2015.

(51) Int. Cl.
*G01S 7/40* (2006.01)
*G01S 13/02* (2006.01)
*G01S 13/42* (2006.01)
*G01S 13/87* (2006.01)
*G01S 13/89* (2006.01)
*G01S 13/60* (2006.01)
*G01S 13/86* (2006.01)
*G01S 13/931* (2020.01)

(52) U.S. Cl.
CPC ........ *G01S 7/4026* (2013.01); *G01S 13/0209* (2013.01); *G01S 13/42* (2013.01); *G01S 13/87* (2013.01); *G01S 13/89* (2013.01); *G01S 13/60* (2013.01); *G01S 13/86* (2013.01); *G01S 2013/9375* (2013.01); *G01S 2013/9378* (2013.01); *G01S 2013/9382* (2013.01); *G01S 2013/9385* (2013.01); *G01S 2013/9389* (2013.01); *G01S 2013/9392* (2013.01)

(58) Field of Classification Search
CPC .......... G01S 13/42; G01S 13/87; G01S 13/89; G01S 13/60; G01S 13/86; G01S 2013/9375; G01S 2013/9378; G01S 2013/9382; G01S 13/9385; G01S 13/9389; G01S 13/9392
USPC ........................................................ 342/174
See application file for complete search history.

(56) References Cited

U.S. PATENT DOCUMENTS

| | | | | |
|---|---|---|---|---|
| 6,142,946 A * | 11/2000 | Hwang | ................ | A61B 8/00 600/459 |
| 6,680,688 B1 * | 1/2004 | Jiang | ................ | G01S 11/16 340/435 |
| 6,727,844 B1 * | 4/2004 | Zimmermann | ....... | B60R 21/013 342/118 |
| 7,095,361 B2 * | 8/2006 | Mattes | ................ | G01S 13/87 180/167 |
| 7,248,153 B2 * | 7/2007 | Danz | ................ | B60Q 9/007 340/435 |
| 7,589,665 B2 * | 9/2009 | Heide | ................ | G01S 7/032 342/118 |
| 7,592,945 B2 * | 9/2009 | Colburn | ................ | G01C 9/00 342/118 |
| 7,973,700 B2 * | 7/2011 | Gohl | ................ | H01Q 3/24 342/118 |
| 8,204,143 B2 * | 6/2012 | Ravid | ................ | H04B 7/0617 327/147 |
| 8,526,528 B2 * | 9/2013 | Ravid | ................ | H04B 7/0617 327/147 |
| 8,854,252 B2 * | 10/2014 | Holder | ................ | G01S 13/003 342/107 |
| 2003/0025629 A1 * | 2/2003 | Barrick | ................ | G01S 7/02 342/59 |
| 2005/0242985 A1 * | 11/2005 | Ponsford | ................ | G01S 7/36 342/59 |
| 2006/0262009 A1 * | 11/2006 | Watanabe | ................ | G01S 7/36 342/159 |
| 2008/0153433 A1 * | 6/2008 | Pallonen | ................ | H03F 3/211 455/90.2 |
| 2009/0185650 A1 * | 7/2009 | Ravid | ................ | H04B 7/0617 375/376 |
| 2009/0231197 A1 * | 9/2009 | Richards | ................ | H01Q 3/2682 342/377 |
| 2011/0053646 A1 * | 3/2011 | Kundmann | ................ | H01Q 3/267 455/562.1 |
| 2012/0224616 A1 * | 9/2012 | Richards | ................ | H01Q 3/2682 375/219 |
| 2012/0230444 A1 * | 9/2012 | Ravid | ................ | H04B 7/0617 375/267 |
| 2013/0089123 A1 * | 4/2013 | Rahul | ................ | H04L 27/2691 375/219 |
| 2014/0253368 A1 * | 9/2014 | Holder | ................ | G01S 13/003 342/146 |
| 2014/0340260 A1 * | 11/2014 | Richards | ................ | H01Q 3/2682 342/377 |

* cited by examiner

FIG. 7C

SCALABLE ARCHITECTURE FOR AN AUTOMOTIVE RADAR SYSTEM

PRIORITY CLAIM

This application is a continuation of U.S. patent application Ser. No. 15/150,669 filed on May 10, 2016, which claims priority to the U.S. provisional patent application 62/160,316 titled "Scalable Architecture for an Automotive Radar System" filed on May 12, 2015, each of which is hereby incorporated by reference in its entirety.

INCORPORATION BY REFERENCE

The entirety of each of the following applications is hereby incorporated herein by reference:
U.S. provisional patent application 62/155,728 titled "Multistatic Radar via an Array of Multifunctional Automotive Transceivers" filed on May 1, 2015;
U.S. provisional patent application Ser. No. 15/142,926 titled "Multistatic Radar via an Array of Multifunctional Automotive Transceivers" filed on Apr. 29, 2016;
U.S. provisional patent application 62/160,015 titled "Calibration of a Multifunctional Automotive Radar System" filed on May 12, 2015;
U.S. provisional patent application 62/154,840 titled "Multifunctional Automotive Radar" filed on Apr. 30, 2015;
U.S. patent application Ser. No. 15/142,935 titled "Multifunctional Automotive Radar" filed on Apr. 29, 2016;
U.S. provisional patent application 62/162,206 titled "Dynamic OFDM Symbol Shaping for Radar Applications" filed on May 15, 2015; and
U.S. provisional patent application 62/167,950 titled "Cooperative and Crowd-Sourced Multifunctional Automotive Radar" filed on May 29, 2015.

BACKGROUND

Limitations and disadvantages of conventional automotive radar systems and methods will become apparent to one of skill in the art, through comparison of such approaches with some aspects of the present method and system set forth in the remainder of this disclosure with reference to the drawings.

BRIEF SUMMARY

Methods and systems are provided for a scalable architecture for an automotive radar system, substantially as illustrated by and/or described in connection with at least one of the figures, as set forth more completely in the claims.

DETAILED DESCRIPTION

Figure 1:
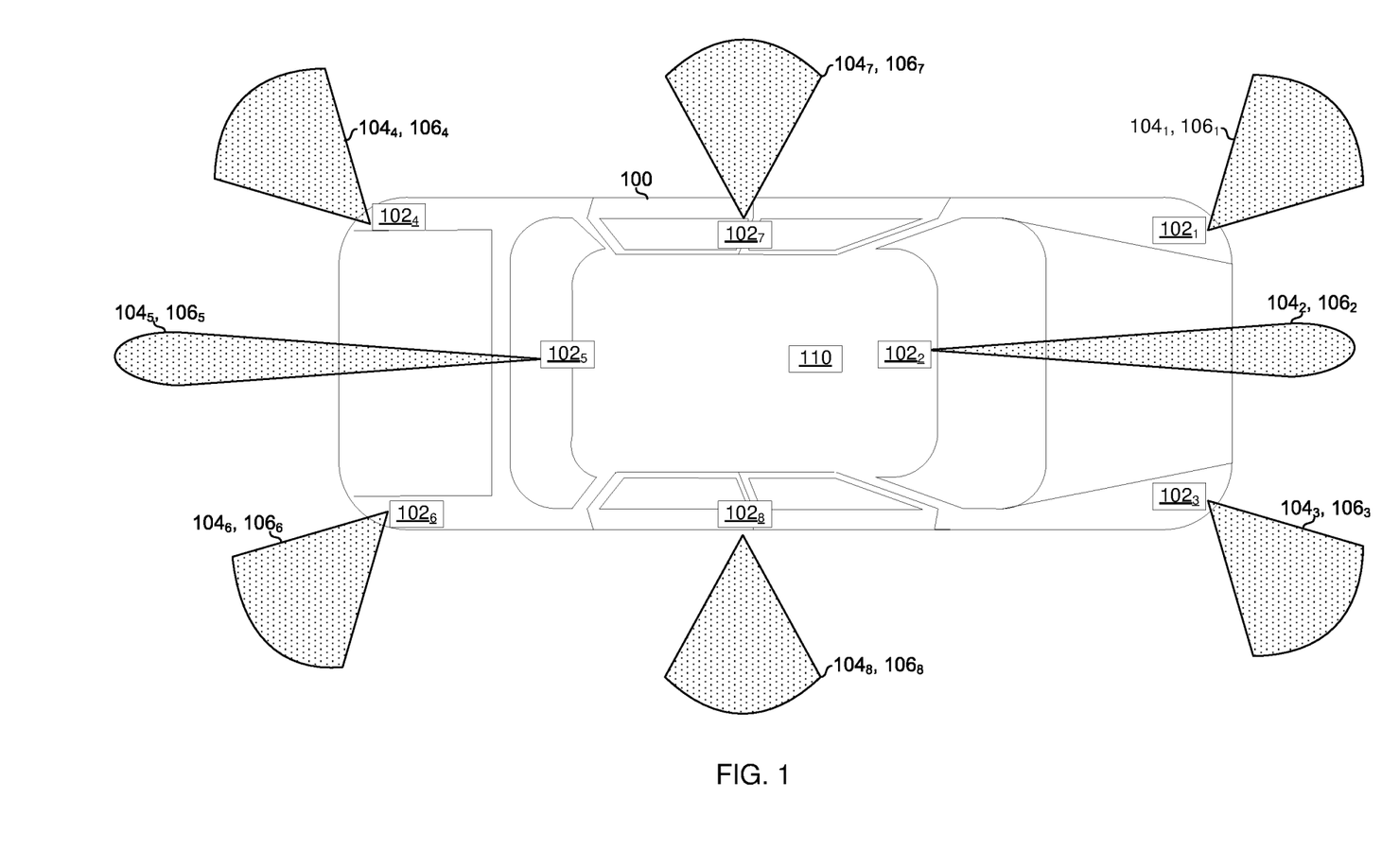
FIG. 1 shows an automobile comprising a plurality of multifunctional radar transceivers.

FIG. 1 shows an automobile comprising a plurality of multifunctional radar transceivers 102 (labeled with subscripts '1' through '8') of an automobile 100. Although the example automobile 100 comprises eight transceivers 102 for illustration, any number may be present. Each multifunctional radar transceiver 102 has a corresponding receive antenna pattern 104 and transmit antenna pattern 106 (for clarity of illustration, the transmit and receive patterns are shown as the same, but they need not be). As discussed in further detail in the remainder of this disclosure, the multifunctional radar transceivers 102 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 100 (the "scene").

The positioning function comprises use of the same millimeter wave signals used for the radar function to improve upon coarse position determined through other mechanisms such as GPS.

The communication function comprises communicating data among the multifunction radar transceivers 102 using of the same millimeter wave signals as are used for the radar function. Such data may include, for example, pixel or voxel data (and time and position metadata) generated using the radar and positioning functions.

Through a combination of the radar function, the positioning function, and the communication function, the multifunctional radar transceivers $102_1$-$102_8$ are operable to generate a scene representation (e.g., 2D pixel grid or 3D voxel grid) where the absolute time of capture of the scene representation and the absolute position of the pixels (2D) or voxels (3D) in the scene representation are known.

The circuitry 110 represents other circuitry of the automobile 100 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 110 may be communicatively coupled to the transceivers 102 via a CANbus, for example. The circuitry 110 may be operable to process data from the transceivers and take action (e.g., trigger driver alerts, transmit messages via one or more of its transceivers, trigger braking or other safety systems, etc.) in response to such data. The circuitry 110 may also generate data which it may pass to the transceiver(s) 102 for communication to a remote transceiver 102 (e.g., that is mounted to another automobile and/or to infrastructure such as the road, sign post, stop-light, etc.) In an example implementation, the circuitry 110 may comprise a cell phone that connects to an electronics system of the automobile 100 via USB, Bluetooth, Wi-Fi, or any other suitable interface and then the electronics system 110 of the automobile 100 leverages the cellular transceiver of the circuitry 110 for connecting to a cellular network.

Figure 2A:
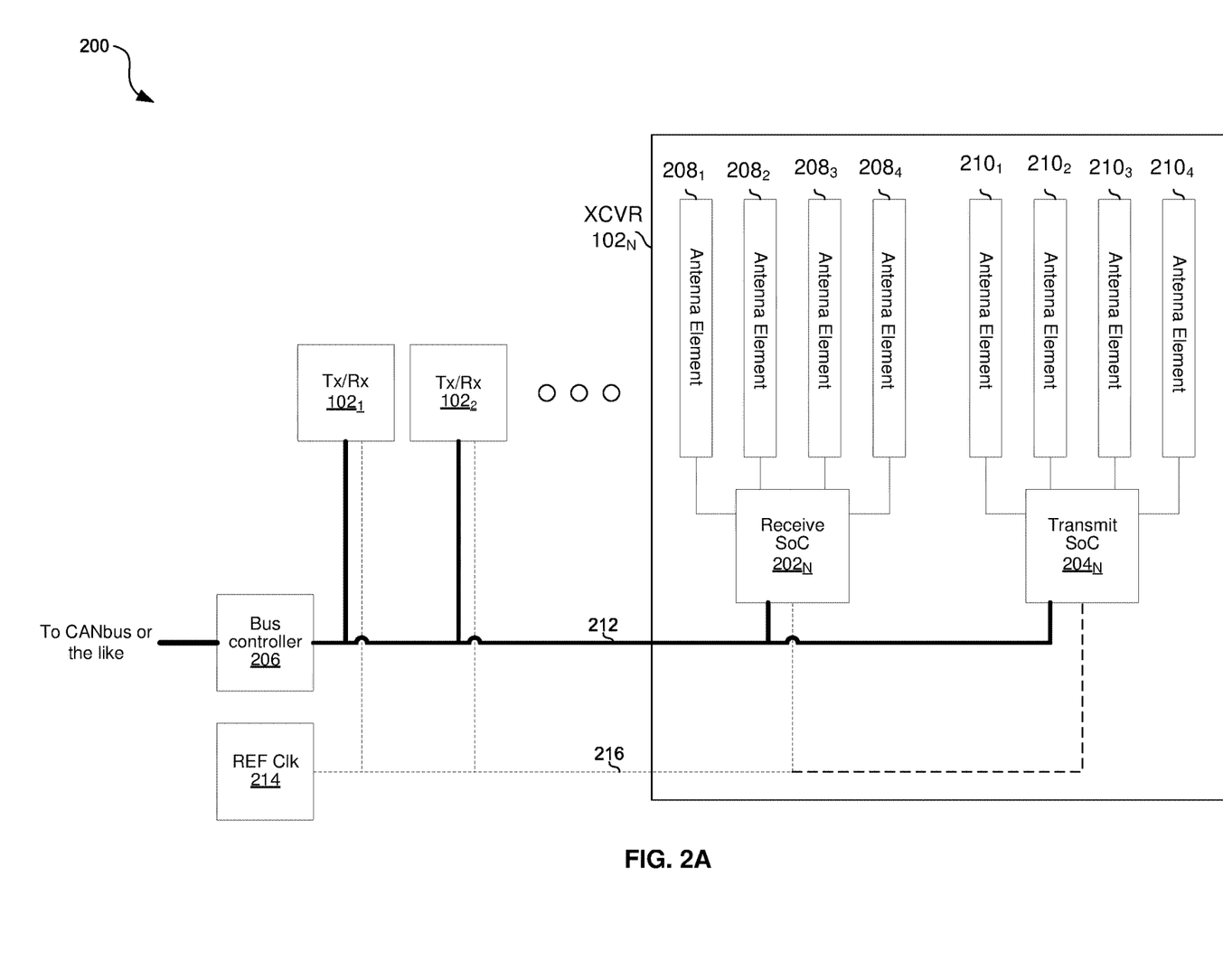
FIG. 2A shows an example architecture of a multifunctional radar system of an automobile.

FIG. 2A shows an example architecture of a multifunctional radar system of an automobile. The example multifunctional radar system 200 comprises N multifunction radar transceivers 102, a bus controller 206, a reference clock generator 214, data bus 212, and clock distribution bus 216. For clarity of illustration, example implementation details are shown for only the $N^{th}$ transceiver ($102_N$), but the other transceivers $102_1$-$102_{N-1}$ may be the same. Each multifunctional radar transceiver $102_n$ (the subscript 'n' used here to generically represent each of the transceivers $102_1$-$102_N$ individually) comprises a receive SoC $202_n$, a transmit SoC $204_n$, a plurality of receive antenna elements 208 (labeled with subscripts 1 through 4, where four was chosen arbitrarily for illustration but any number greater than one may be used), and a plurality of transmit antenna elements 210 (labeled with subscripts 1 through 4, where four was chosen arbitrarily for illustration but any number greater than one may be used, and the number of transmit antenna elements need not match the number of receive antenna elements). In an example implementation, each of the multifunctional radar transceivers 102 comprises one or more CMOS dies on a printed circuit board. In an example implementation, each of the receive SoCs $202_N$, the transmit SoC $204_N$, the bus controller 206, and the reference clock generator 214 is a separately packaged CMOS integrated circuit.

Each of the receive antenna elements $208_1$-$208_4$ comprises, for example, a copper microstrip patch antenna on a printed circuit board (e.g., FR4, Duroid, or the like). Although four elements 208 are shown for illustration, any number may be used.

Each receive SoC $202_n$ is operable to receive millimeter wave signals (e.g., in the 76 to 81 GHz band) via the antenna elements $208_1$-$208_4$. The receive SoC $202_n$ is operable to process received millimeter wave signals for supporting the radar, positioning, and communication functions. The receive SoC $202_n$ is also operable to communicate over data bus 212 and to synchronize its timing to a signal output by reference clock 214 onto clock distribution bus 216. Additional details of an example receive SoC $202_n$ are described below with reference to FIG. 2B.

Each of the transmit antenna elements 210 comprises, for example, a copper microstrip patch antenna on a printed circuit board (e.g., FR4, Duroid, or the like). Although four elements 210 are shown for illustration, any number may be used.

The transmit SoC $204_n$ is operable to transmit millimeter wave signals (e.g., in the 76 to 81 GHz band) via the antenna elements $210_1$-$210_4$. The transmit SoC $204_n$ is operable to generate the signals in such a manner as to support the radar, positioning, and communication functions. The transmit SoC $204_n$ is also operable to communicate over data bus 212 and to synchronize its timing to a signal output by reference clock 214 onto clock distribution bus 216. Additional details of an example transmit SoC $204_n$ are described below with reference to FIG. 2C.

The bus controller 206 is operable to relay data between the data bus 212 interconnecting the multifunction radar transceivers $102_1$-$102_N$ and a data bus of the automobile 100 (e.g., a CAN bus). The bus 212 may, for example, be a high speed serial bus and the bus controller 206, receive SoC $202_n$, and transmit SoC $204_n$ may each be operable to perform serialization and deserialization for communicating over the bus 212.

The reference clock generator 214 comprises a crystal oscillator, phase locked loop, and/or other circuitry for generating a signal to act as a phase reference for receive SoC $202_n$ and transmit SoC $204_n$. In an example implementation, the frequency of the reference signal may be relatively low compared to the millimeter wave frequencies (e.g., on the order of tens or hundreds of MHz), which may greatly relax the routing requirements for the bus 216 as compared to trying to distribute a reference signal in the 77 to 81 GHz range. In another example implementation, the frequency of the reference signal may be the same as the millimeter wave carrier frequency (e.g., it the range 77 to 81 GHz).

Figure 2B:
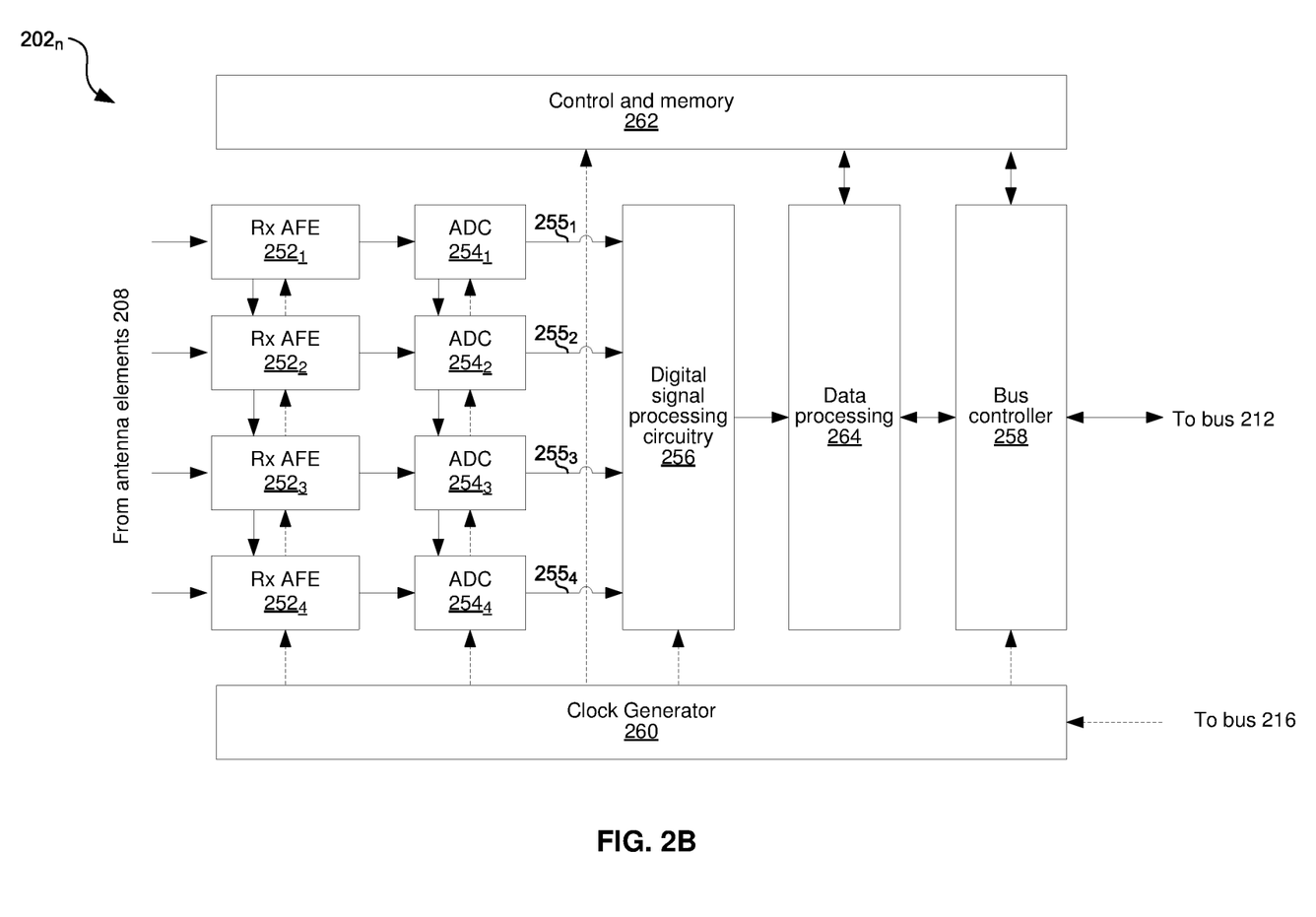
FIG. 2B shows an example implementation of a receiver system on chip (SoC) of a multifunctional radar transceiver of FIG. 2A.

FIG. 2B shows an example implementation of a receiver system on chip (SoC) of the multifunctional radar transceiver of FIG. 2A. The example receive SoC $202_n$ comprises a plurality (a number corresponding to the number of receive antenna elements 208) of receive analog front ends (Rx AFEs) 252, a plurality of analog-to-digital converters (ADCs) 254, digital signal processing circuitry 256, data processing circuitry 264, bus controller circuitry 258, clock generation circuitry 260, and control and memory circuitry 262.

Each of the Rx AFEs 252 is operable to process a millimeter wave signal (e.g., in the band from 76 to 81 GHz) from a respective one of the plurality of antenna elements 208. The processing may comprise, for example, low noise amplification, filtering, and down-conversion so as to output a 1 to 5 GHz wide intermediate frequency or baseband signal.

Each of the ADCs 254 is operable to digitize the output of a corresponding one of the Rx AFEs 252. For example, each Rx AFE 252 may downconvert a received 76 to 77 GHz band to a 1 GHz wide baseband signal which the corresponding ADC 254 may then digitize to generate a 1 GHz wide digital signal. As another example, each Rx AFE 252 may downconvert a received 76 to 81 GHz band to a 5 GHz wide baseband signal which the corresponding ADC 254 may then digitize to generate a 5 GHz wide digital signal 255.

The digital signal processing circuitry 256 is operable to process the digitized signals from the plurality of ADCs 254 to recover information conveyed by the received signals. Such information may be conveyed by characteristics (e.g., latency, Doppler shift, signal strength, etc.) of the received signals, as is the case in a conventional radar system, and/or may be data that was modulated onto the received signals.

The processing performed by the digital signal processing circuit 256 may comprise, for example, channel estimation and equalization.

The processing performed by the digital signal processing circuit 256 may, where the millimeter wave signals are modulated by a data signal, comprise demodulation. For example, the millimeter wave signals transmitted by transceivers 102 may comprise bursts (or "chirps") whose amplitude is modulated relatively slowly as compared to the channel frequency (e.g., a few MHz as compared to a channel frequency of 76-81 GHz), and the digital signal processing circuitry 256 may be operable to track the signal envelope to recover the data signal. As another example, the millimeter wave signals transmitted by transceivers 102 may comprise OFDM symbols and the digital signal processing circuit 256 may be operable to demodulate the received signals using a discrete Fourier transform. The digital signal processing circuit 256 may then be operable to demap the modulated signal according to one or more symbol constellations, deinterleave the demapped bits, and decode the demapped bits. The recovered bits may then be provided to the control and memory subsystem 262 and/or output onto the bus 212.

The processing performed by the digital signal processing circuit 256 may comprise beamforming. The beamforming may comprise time-domain beamforming in which one or more sets of phase and amplitude coefficients is applied to each of the signals 255 in the time domain. Alternatively, or additionally, the beamforming may comprise frequency-domain beamforming in which the signals 255 are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

The processing performed by the digital signal processing circuit 256 may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected.).

The processing performed by the digital signal processing circuit 256 may comprise separating different transmitted signals (e.g., originating from different ones of the transceivers $102_1$-$102_8$). The may comprise, for example, correlating the received signals with different orthogonal codes and/or pseudorandom sequences used by different ones of the transceivers $102_1$-$102_8$. Alternatively, or additionally, separating different transmitted signals (e.g., to determine which transceiver 102 sent which signal) may comprise directly recovering a respective identifier (e.g., a unique identifier such as a MAC address or similar) modulated onto each of the millimeter wave signals. The ability to distinguish which, if any, energy arrived from each transceivers $102_1$-$102_8$ may be useful for performing the radar function, the positioning function, and the communication function of the transceivers 102. For the radar and positioning functions, for example, the identification of which of transceivers $102_1$-$102_8$ sent any particular received signal may be used for determining the position and angle from which the signal was transmitted (since the different transceivers $102_1$-$102_8$ are at different positions on the automobile 100), which may be used for determining precise distance to, and location of, objects in the scene. For the communication function, for example, the identification of which of transceivers $102_1$-$102_8$ sent any particular received signal may be used in a manner similar to a "from" address in many networking protocols.

The data processing circuitry 264 is operable to process data output by the digital signal processing circuitry 256. Such processing may comprise, for example, implementing algorithms to generate a representation of the scene detected using the radar function. Based on the angle, strength, timing, spectral content, and/or other characteristics of the received signals, the data processing circuitry 264 may generate a 2D pixel grid or 3D voxel grid. In an example implementation, each pixel or voxel may indicate an absolute position to which it corresponds (determined via the positioning function of the multifunction radar system), the strength of returns, if any, received from that location (determined via the radar function of the multifunction radar system), spectral content of returns, if any, received from that location, and/or time(s) at which returns were received from that location and/or at which the pixel or voxel data was updated.

The data processing circuitry 264 may also be operable to process data received from the data bus 212. For example, positioning information may be received via the bus 212 (e.g., GPS coordinates from a GPS receiver of the vehicle 100) and combined with data recovered from the digital processing circuitry 264 for performing the positioning function.

The processing performed by data processing circuitry 264 of data output by digital signal processing circuitry 256 may comprise, for example, preparing data for output onto the data bus 212. For example, a scene representation generated from the output of the digital signal processing circuity 256 may be transmitted onto the data bus 212.

The bus controller circuitry 258 may be substantially similar to the bus controller 206 described above.

The clock generation circuitry 260 is operable to generate a plurality of timing signals that are synchronized to the timing signal received via bus 216. The timing signals may comprise, for example: a local oscillator signal for direct downconversion of received millimeter wave signals (e.g., in the 76 to 81 GHz range), a sampling clock for the ADCs 254 (e.g., between 2 and 20 GHz), and one or more clocks for clocking the digital processing circuitry 256, the bus controller 258, and the control and memory subsystem 262.

The control portion of subsystem 262 is operable to manage operations of the receiver SoC $202_n$ (e.g., implement a state machine and/or other control logic that controls the configuration of the other components of the receive SoC $202_n$). The control portion of subsystem 262 may, for example, configure beamforming matrices used by the digital signal processing circuitry 256. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications from other transceivers 102 that are likely to come from that direction. Directions of interest may be determined based on, for example, data received via the data bus, data carried in previously received millimeter wave signals, and/or previously generated scene representations.

The memory portion of subsystem 262 is operable to store relatively large amounts (e.g., hundreds of megabits) of information of a variety of forms. For example, beamforming matrices, an identifier of the transceiver 102, scrambling codes, and messages received from (via data bus 212) and/or to be communicated to (via data bus 212 and/or via millimeter wave signals) other transceivers are just some examples of the information which may be stored in the memory and readily accessible to the SOC $202_n$.

Figure 2C:
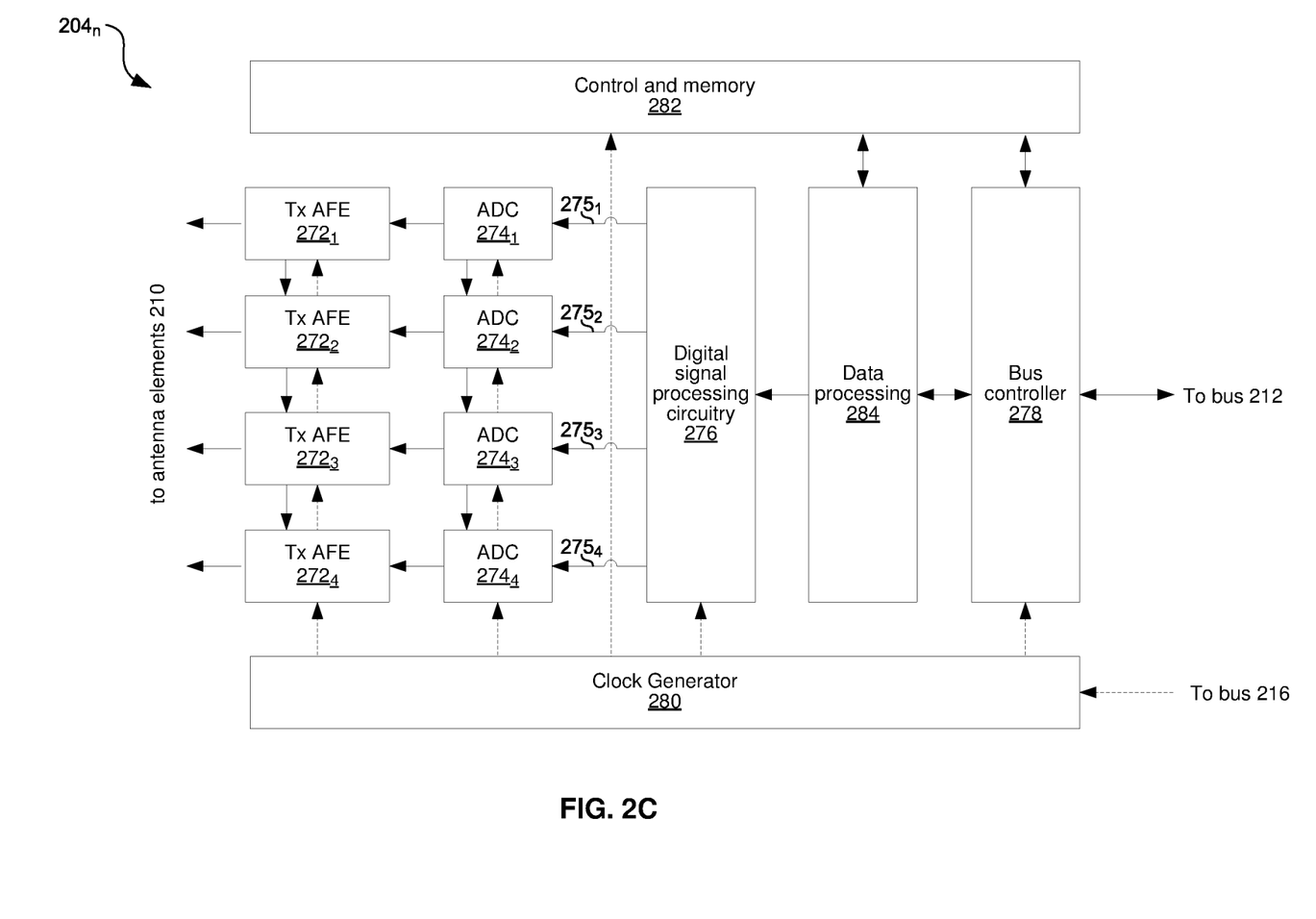
FIG. 2C shows an example implementation of a transmitter system on chip (SoC) of a multifunctional radar transceiver of FIG. 2A.

FIG. 2C shows an example implementation of a transmitter system on chip (SoC) of the multifunctional radar transceiver of FIG. 2A. The example transmit SoC $204_n$ comprises a plurality of transmit analog front ends (Tx AFEs) 272, a plurality of analog-to-digital converters (ADCs) 274, digital signal processing circuitry 276, data processing circuitry 284, bus controller circuitry 278, clock generation circuit 280, and control and memory subsystem 282.

Each of the Tx AFEs 272 is operable to receive an analog baseband signal from a respective one of ADCs 274, upconvert the signal to a millimeter wave (e.g., a 1 GHz to 5 GHz wide signal in the band from 76 to 81 GHz), and amplify the millimeter wave signal for output to a respective one of antenna elements $210_1$-$210_4$.

Each of the ADCs 274 is operable to convert a digital signal 275 from the digital signal processing circuitry 276 to an analog representation. For example, each signal 275 may be a 1 GHz to 5 GHz wide baseband signal.

The digital signal processing circuitry 276 is operable to process one or more data streams from data processing circuitry 284 to generate a plurality (four in the example shown) of digital baseband signals 275. Processing performed by digital signal processing circuitry 276 may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The processing performed by the digital signal processing circuit 276 may comprise generating modulated signals $275_1$-$275_4$ and/or generating a data signal to be modulated onto a carrier. As an example of the former case, the digital signal processing circuit 276 may output a continuous wave signal, or a chirp whose amplitude is modulated by a data signal whose frequency is relatively low (e.g., a few MHz) as compared to the channel frequency (e.g., between 76 GHz and 81 GHz). As another example of the former case, the digital signal processing circuit 276 may output an OFDM signal. As an example of the latter case, the digital signal processing circuit 276 may output a relatively low bandwidth data signal (e.g., a few MHz) which may modulate a millimeter wave chirp generated by the clock generator 280.

The processing performed by the digital signal processing circuit 276 may comprise beamforming. The beamforming may comprise time-domain beamforming and/or frequency-domain beamforming.

Data processing circuit 284 is operable to generate one or more data signals for modulation onto the millimeter wave signals transmitted by the SoC 204$_n$. The data streams may, for example, be read from memory of the SoC 202$_n$ (e.g., an identifier of the module 102$n$) and/or generated algorithmically (e.g., timestamps generated based on a clock of the control portion of subsystem 282). Additionally, or alternatively, the data may be received from bus 212 via bus controller 278. The data processing circuit 284 may packetize and/or otherwise format the data.

Bus controller 278 may be substantially similar to the bus controller 206 described above.

Clock generation circuit 280 is operable to generate a plurality of timing signals that are synchronized to the timing signal received via bus 216. The timing signals may comprise, for example: a local oscillator signal for upconversion of baseband signals to millimeter wave signals (e.g., in the 76 to 81 GHz range), a sampling clock for the DACs 274 (e.g., between 2 and 20 GHz), and one or more clocks for clocking the digital processing circuitry 276, the bus controller 278, and the control and memory subsystem 282.

The control portion of subsystem 282 is operable to manage operations of the receiver SoC 204$_n$ (e.g., implement a state machine and/or other control logic that controls the configuration of the other components of the receive SoC 204$_n$). The control portion of subsystem 282 may, for example, configure beamforming matrices used by the digital signal processing circuitry 276. For example, the control portion of subsystem 282 may determine that particular directions are of interest at a given time and may configure the beamforming to point beams in those particular directions. Particular directions may be of interest because, for example, it may be desirable to determine more information about objects located in that direction and/or to listen for communications from other transceivers 102 that are likely to come from that direction. Directions of interest may be determined based on, for example, data received via the data bus, scene scanning algorithms, and/or the like.

The memory portion of subsystem 282 is operable to store relatively large amounts (e.g., hundreds of megabits) of information of a variety of forms. For example, beamforming matrices, and messages received from (via data bus 212 and/or millimeter wave signals) and/or to be communicated to (via data bus 212 and/or modulated onto millimeter wave radar signals) other transceivers are just some examples of the information which may be stored in the memory and readily-accessible to the SoC 204$n$.

Figure 3A:
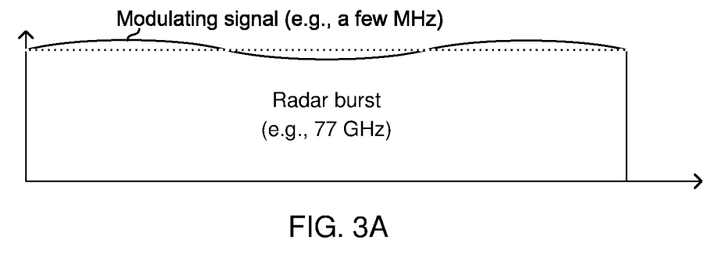
FIGS. 3A and 3B show two example signal formats used by a multifunctional radar transceiver.
Figure 3B:
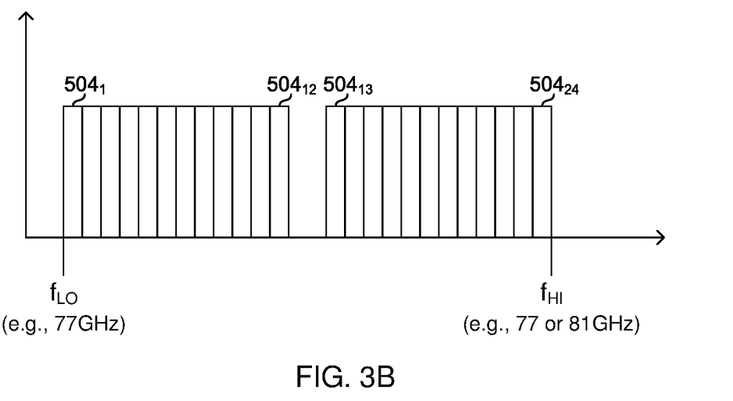

FIGS. 3A and 3B show two example signal formats used by a multifunctional radar transceiver. In FIG. 3A, the millimeter wave signal (e.g., a continuous wave signal or series of frequency ramped "chirps") is amplitude modulated by a relatively slowly varying data signal. In FIG. 3B the millimeter wave signal is an OFDM signal which, for any given burst (frame) may transmit one or more of a plurality of subbands 504 (twenty-four subbands were chosen arbitrarily for illustration, any number may be used). Each of the subbands $504_1$-$504_{24}$ may be a continuous wave or may be modulated by a data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, different subbands and/or groups of subbands may be pointed in different directions for detecting objects at different locations in the scene and/or for transmitting the data signal in directions (e.g., pointed at different reflection paths leading to different ones of the transceivers $102_1$-$102_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 4:
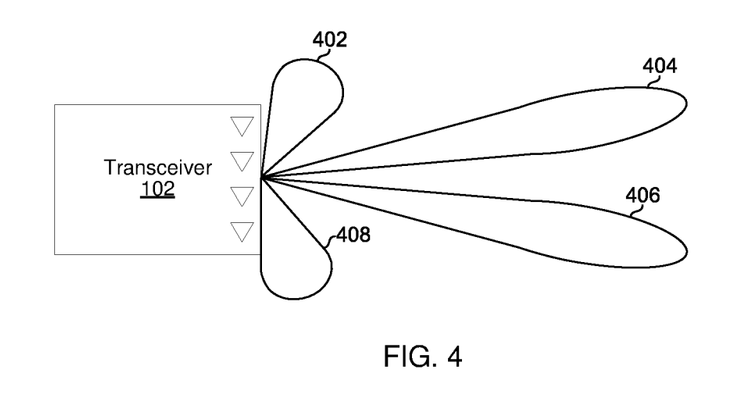
FIG. 4 shows an example antenna pattern of the multifunctional radar transceiver of FIG. 2

FIG. 4 shows an example antenna pattern of the multifunctional radar transceiver of FIG. 2. For example, for the radar function, lobes 402 and 408 may be used for identifying objects that are relatively close and off to the side of the transceiver 102$_n$, and the lobes 404 and 406 may be used for looking further in the distance (e.g., in the direction of travel of the automobile 100 or looking behind the automobile 100). As another example, for the radar function, the lobes 402 and 408 may receive returns from the nearby road surface and the Doppler of such returns may be used for calculating the speed of the automobile 100. As another example, for the communication function, lobes 402 and 408 may be used for directly communicating with another transceiver 102 off to the side of the depicted transceiver 102$_n$ and lobes 404 and 406 may be used for communicating with other transceivers by bouncing the signals off of objects in the scene.

Although four beams/lobes are shown for illustration, the multifunctional radar transceivers are not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 402, 404, 406, and 408 may change periodically, based on what is detected in the scene, based on desired communication to be sent or received, and/or the like.

Figure 5:
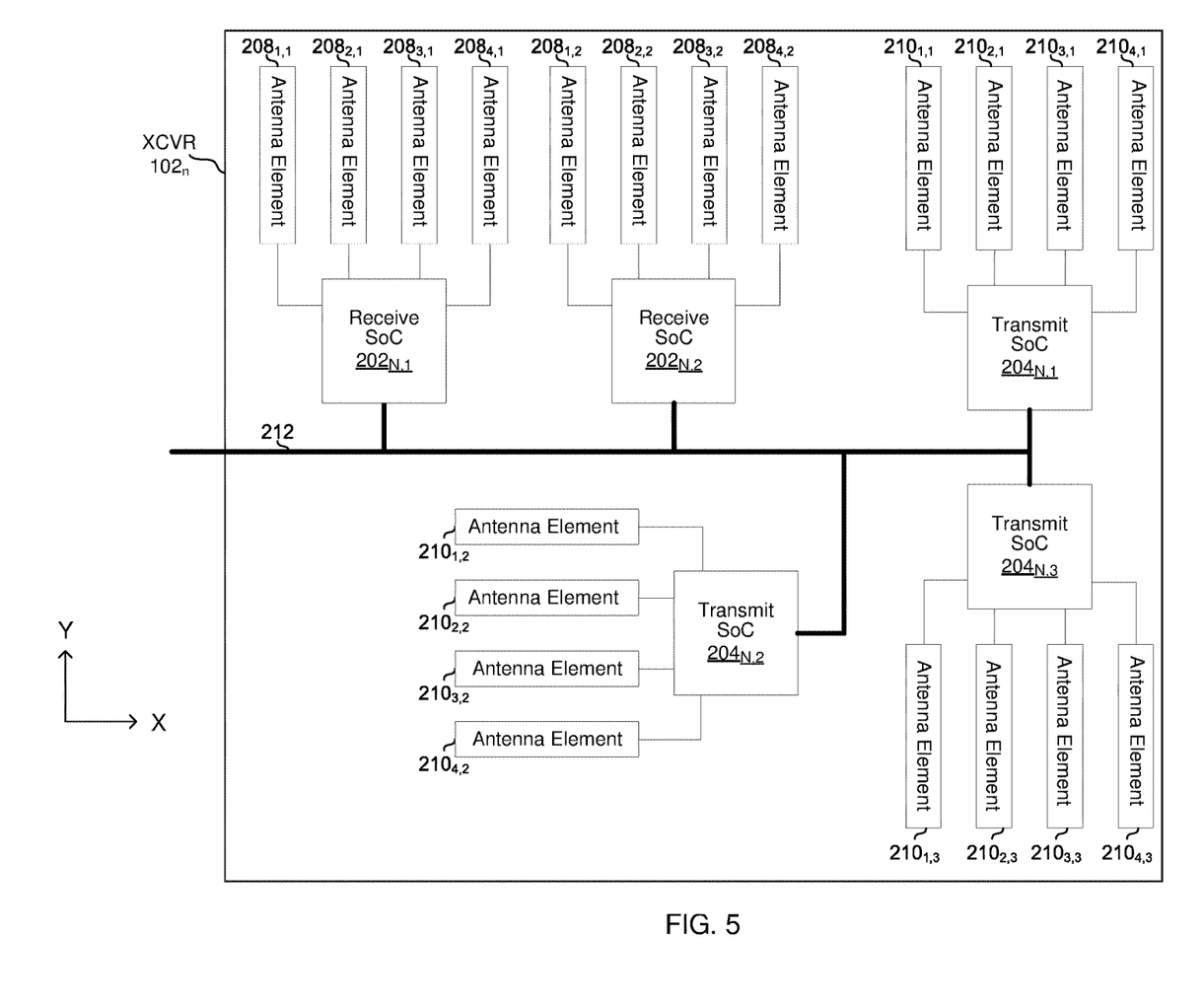
FIG. 5 illustrates the ability of a multifunctional radar transceiver of the present disclosure to scale to arbitrary numbers and orientations of transmit and receive antenna elements.

FIG. 5 illustrates the ability of a multifunctional radar transceiver of the present disclosure to scale to arbitrary numbers and orientations of transmit and receive antenna elements. In FIG. 5 the transceiver $102_N$ comprises two receive SoCs $202_{N,1}$ and $202_{N,2}$, and three transmit SoCs $204_{N,1}$, $204_{N,2}$, and $204_{N,3}$.

The two receive SoCs $202_{N,1}$ and $202_{N,2}$, (and their respective antenna elements $208_{1,1}$-$208_{4,1}$ and $208_{1,2}$-$208_{4,2}$) have the same orientation and are arranged linearly in the X direction. In this manner, the transceiver $102_N$ may, for example, have greater gain and/or scanning resolution in the X direction as compared to use of just a single receive SoC 202.

Each of the three transmit SoCs 204 has a different orientation, with two of the three sets of antenna elements ($210_{1,1}$-$210_{4,1}$ and $210_{1,3}$-$210_{4,3}$) being arranged in the X direction, and the third set of antenna elements ($210_{1,2}$-$210_{4,2}$) being arranged in the Y direction. By having transmit antenna arrays oriented in both X and Y directions, the transceiver $102_N$ may be operable to scan/sweep its transmit beam(s) in the X and Y directions.

Again, the choice of two receive SoCs 202 and three transmit SoCs 204 was chosen arbitrarily for illustration—the architecture allows a transceiver $102_N$ to have any number of receive SoCs 202, and any number of transmit SoCs, 204 as desired for a particular implementation. Similarly, the choice of the two receive SoCs 202 being similarly oriented and the three transmit SoCs 304 being differently oriented was chosen arbitrarily—the architecture allows for each SoC 202 and/or 204 of a transceiver $102_N$ to be in any orientation and relative position as desired for a particular implementation.

In an example implementation, upon power up of the transceiver 102n each SoC 202 and 204 may engage in a discovery protocol over bus 212 to discover the number of transmit SoCs and the number of receive SoCs. This information may then be used to perform phase calibration as further described below.

Figure 6A:
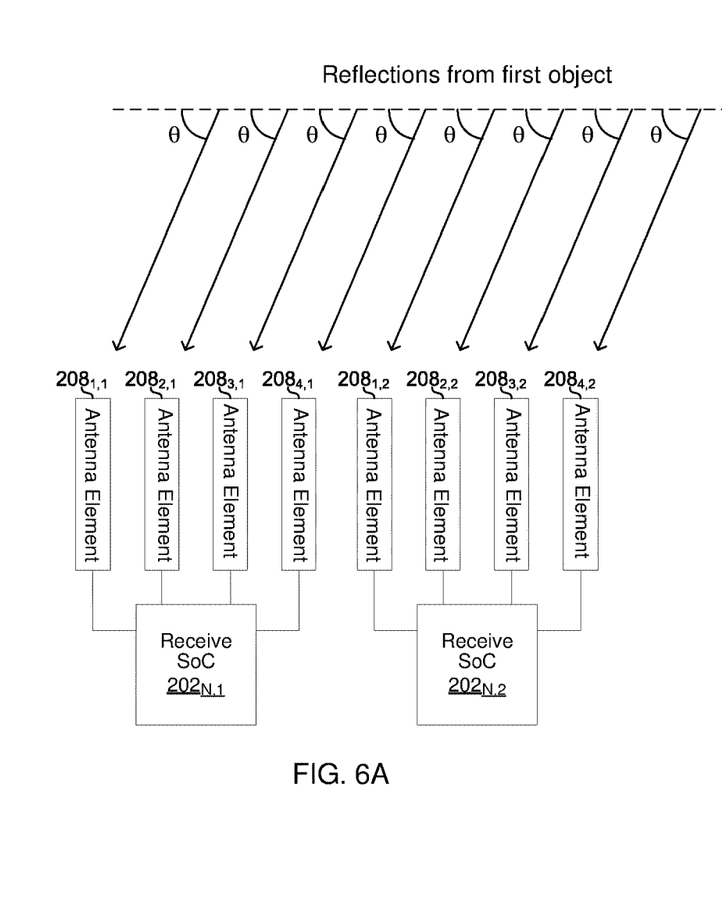
FIGS. 6A-B illustrate phase calibration of a plurality of receive SoCs of a multifunctional radar transceiver in accordance with an example implementation of this disclosure.
Figure 6B:
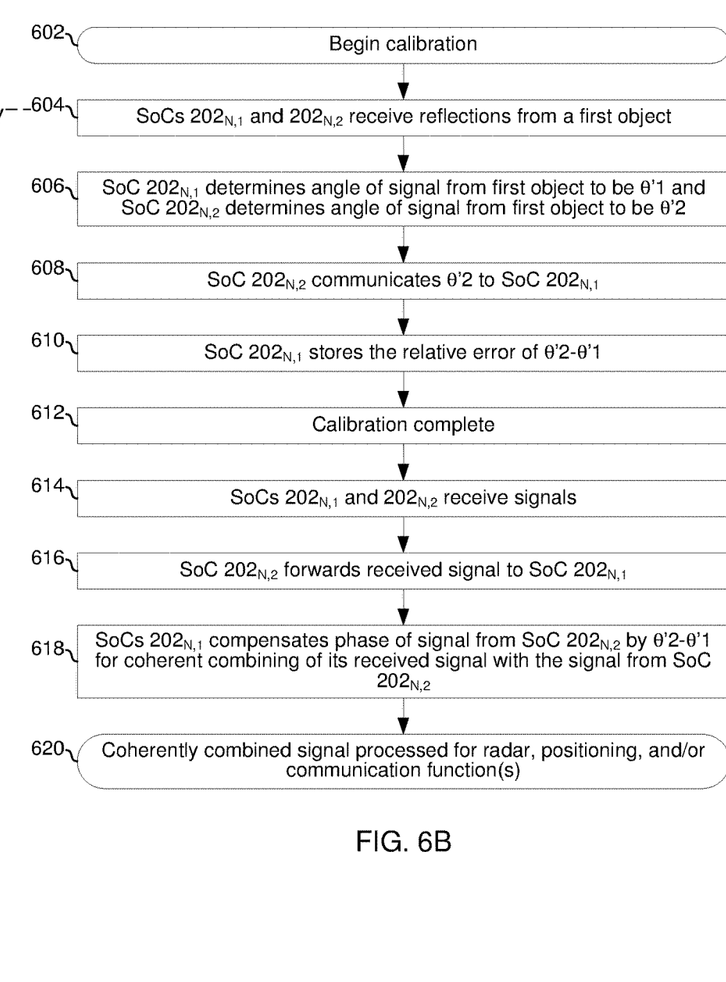

FIGS. 6A-B illustrate phase calibration of a plurality of receive SoCs of a multifunctional radar transceiver in accordance with an example implementation of this disclosure. In FIG. 6A there is shown two receive SoCs $202_{N,1}$ and $202_{N,2}$ receiving reflections from a particular object. The distance to the object is sufficiently large, and the distance between the two receive SoCs $202_{N,1}$ and $202_{N,2}$ sufficiently small, such that the reflections are arriving at what can be treated as a uniform angle, θ, across the antenna arrays.

In block 602, a calibration of the two SoCs $202_{N,1}$ and $202_{N,2}$ is triggered.

In block 604, the two SoCs $202_{N,1}$ and $202_{N,2}$ begin receiving reflections from the first object. There are a number of ways in which it may be assured that both SoCs $202_{N,1}$ and $202_{N,2}$ are looking at the first object (and not looking at different objects). For example, the characteristics (spectral content, signal strength, and/or other characteristics that are insensitive to phase offsets between the local oscillators of the two SoCs $202_{N,1}$ and $202_{N,2}$) of the signals received by SoC $202_{N,1}$ may be compared to the characteristics of the signals received by SoC $202_{N,2}$ to ensure there is a reasonable confidence that they are looking at signals from the same object. As another example, the environment may be controlled (e.g., on the automobile assembly line) such that there is only one possible object that both receive SoCs will see.

In block 606, the receive SoC $202_{N,1}$ measures the angle of the reflections to be θ'1 and the receive SoC $202_{N,2}$ measures the angle to the reflections to be θ'2.

In block 608, the receive SoC $202_{N,2}$ communicates its measured angle, θ'2, to SoC $202_{N,2}$ via bus 212.

In block 610, the receive SoC $202_{N,1}$ stores θ'2−θ'1 as the error between the two SoCs $202_{N-1}$ and $202_{N,2}$. This error is attributed to a phase difference between the phase of the clock generator 260 of the SoC $202_{N,1}$ and the phase of the clock generator 260 of the SoC $202_{N,2}$.

In block 612, calibration is complete and normal operation commences.

In block 614, the SoCs $202_{N,1}$ and $202_{N,2}$ receive millimeter wave signals.

In block 616, SoC $202_{N,2}$ forwards its received signal to the SoCs $202_{N,1}$ (either via bus 212 and/or by modulating the data onto a millimeter wave signal that it transmits).

In block 618, SoCs $202_{N,1}$ compensates the signal from SoCs $202_{N,2}$ by a phase offset corresponding to the error θ'2−θ'1, and then coherently combines its received signal with the signal from SoC $202_{N,2}$.

In block 620, the coherently combined millimeter wave signal is processed to recover information for the radar, position, and/or communication function(s).

Figure 7A:
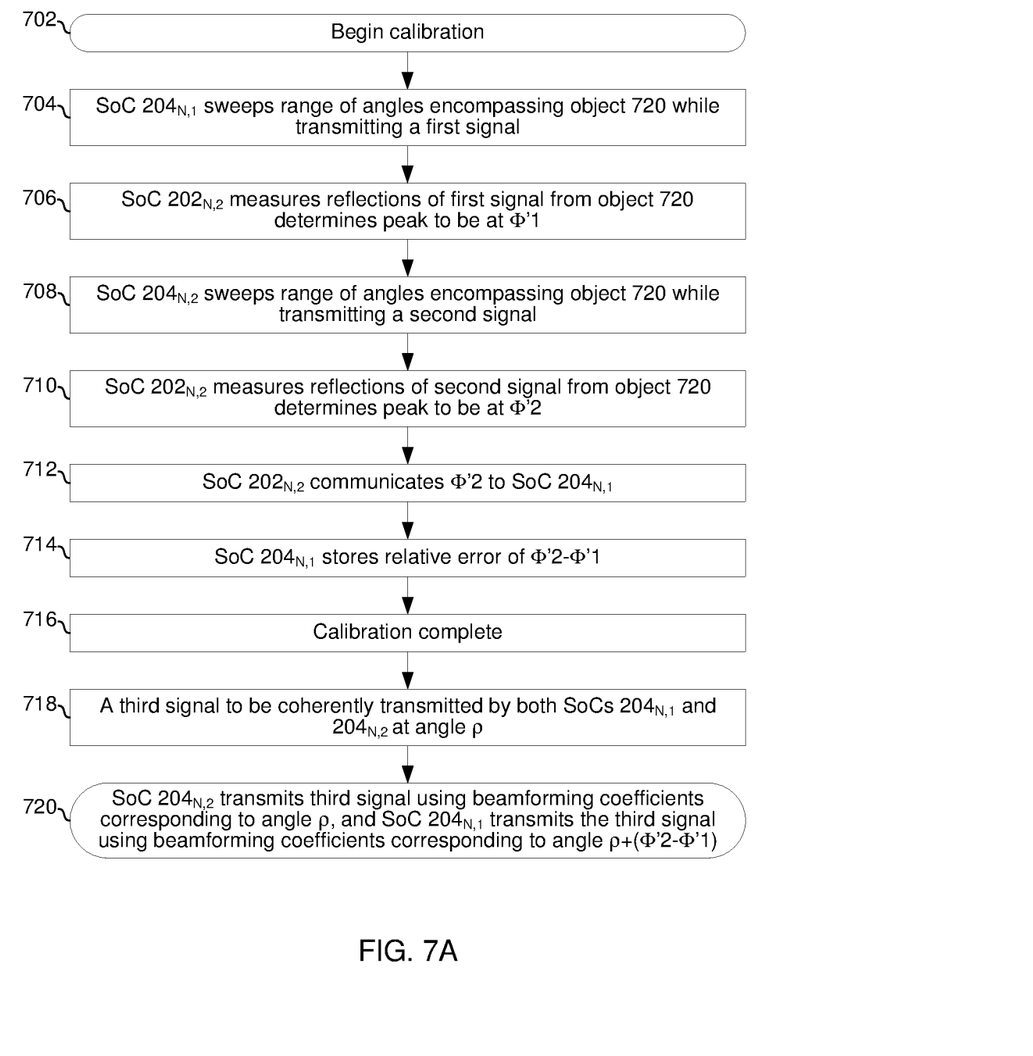
FIGS. 7A-C illustrate phase calibration of a plurality of transmit SoCs of a multifunctional radar transceiver in accordance with an example implementation of this disclosure.
Figure 7B:
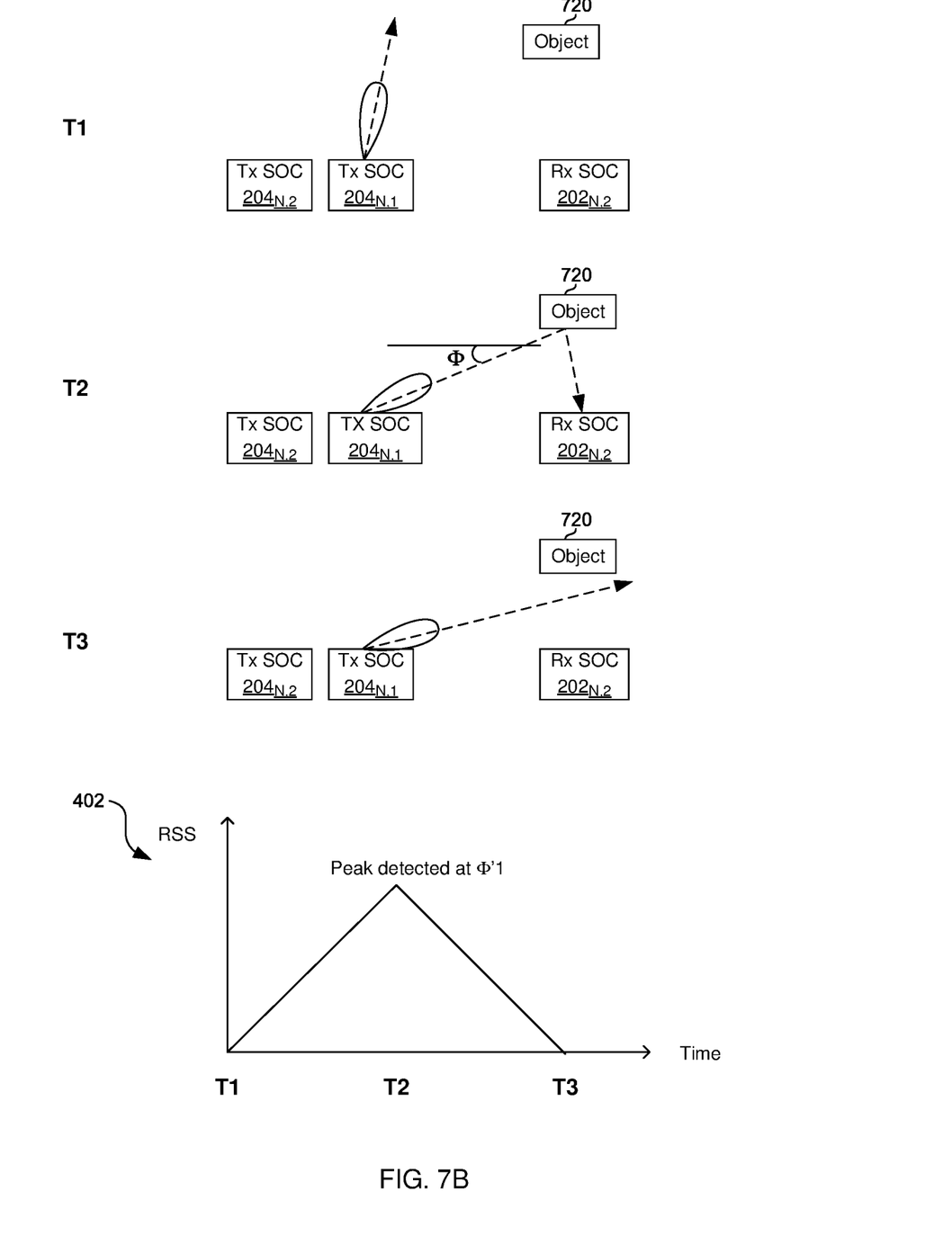
Figure 7C:
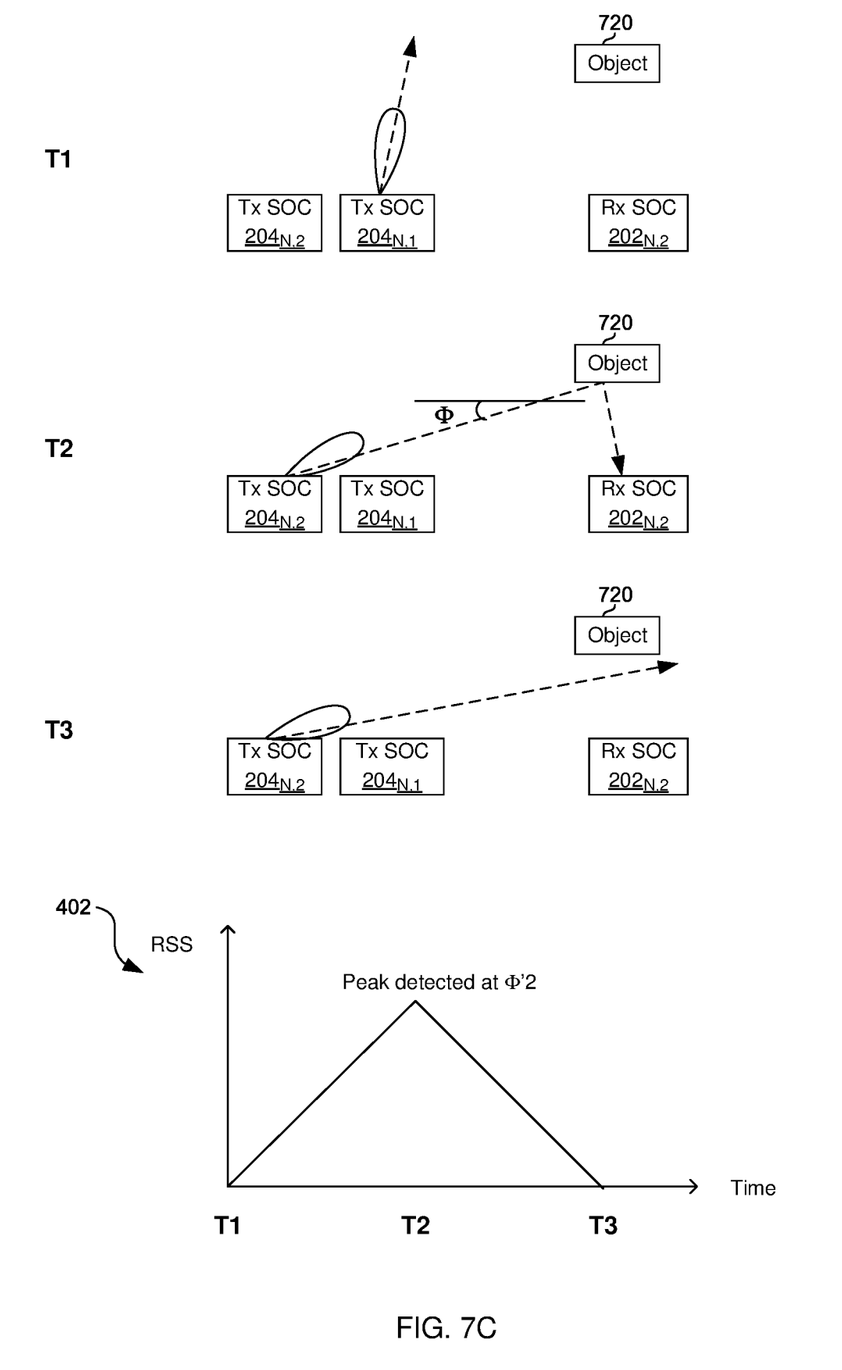

FIGS. 7A-C illustrate phase calibration of a plurality of transmit SoCs of a multifunctional radar transceiver in accordance with an example implementation of this disclosure.

In block 702, a calibration of two transmit SoCs $204_{N,1}$ and $204_{N,2}$ is triggered.

In block 704, SoC $204_{N,1}$ sweeps a range of angles encompassing an object 720 while transmitting a first millimeter wave signal.

In block 706 SoC $202_{N,2}$ measures reflections of the first signal off of object 720 and measures peak power of the first signal to occur at angle Φ'1.

Blocks 704 and 706 are illustrated by FIG. 7B.

In block 708, SoC $204_{N,2}$ sweeps a range of angles encompassing object 720 while transmitting a second millimeter wave signal.

In block 710 SoC $202_{N,2}$ measures reflections of the second signal off of object 720 and measures peak power of the second signal to occur at angle Φ'2.

Blocks 708 and 710 are illustrated by FIG. 7C.

In block 712, SoC $202_{N,2}$ communicates Φ'2 to SoC $204_{N,1}$ via data bus 212.

In block 714, SoC $204_{N,1}$ stores the relative error of Φ'2−Φ'1.

In block 716, calibration is complete.

In block 718, a third signal, to be coherently transmitted by both SoCs $204_{N,1}$ and $204_{N,2}$ at angle ρ, is generated. For example, data to be transmitted on the third signal, and/or instructions for generating the third signal, is communicated to the SoCs $204_{N,1}$ and $204_{N,2}$ via bus 212.

In block 720, SoC $204_{N,2}$ transmits the third signal using beamforming coefficients corresponding to angle ρ, and the SoC $204_{N,1}$ transmits the third signal using beamforming coefficients corresponding to angle ρ compensated by the Φ'2−Φ'1 such that its transmitted signal is phase coherent with the transmitted signal of $SoC_{N,2}$.

In accordance with an example implementation of this disclosure, first transmitter circuitry (e.g., $204_{N,1}$) comprises bus interface circuitry (e.g., 278) and clock generation circuitry (e.g., 280). The first transmitter circuitry may communicate, via the bus interface circuitry, on a data bus (e.g., 212) to detect whether any second transmitter circuitry (e.g., $204_{N,2}$) is coupled to the data bus. In instances that no second transmitter circuitry is detected as being coupled to the data bus, the first transmitter circuitry may transmit beamformed signals via a first plurality of antenna elements (e.g., 210) using beamforming coefficients. In instances that second transmitter circuitry is detected as being coupled to the data bus, the first transmitter circuitry may determine a phase offset between clock generation circuitry (e.g., 280 of $205_{N,1}$) of the first transmitter circuitry and clock generation circuitry (e.g., 280 of $205_{N,2}$) of the detected second transmitter circuitry. The first transmitter circuitry may compensate the beamforming coefficients based on the determined phase offset. The first transmitter circuitry may generate, using the compensated beamforming coefficients, and transmit, via the first plurality of antenna elements, compensated signals that are phase coherent with other signals transmitted by the detected second transmitter circuitry via a second plurality of antenna elements. The determination of the phase offset may comprise transmission, by the first transmitter circuitry during a calibration period, of calibration signals via the first plurality of antenna elements. The determination of the phase offset may comprise adjustment of the beamforming coefficients during the transmission of the calibration signals such that a transmit antenna pattern of the calibration signal sweeps over a range of angles during the calibration period. The first transmitter circuitry may modulate a millimeter wave radar burst to generate the calibration signals. The system may comprise receiver circuitry (e.g., $202_{N,1}$) coupled to the data bus. The first transmitter circuitry may receive, via the data bus during the calibration period, an indication of a strength of a reflection of the calibration signals received by the receiver circuitry. The first transmitter circuitry may use the indication of strength of the reflection for the determination of the phase offset. The receiver circuitry may demodulate the calibration signals to recover information (e.g., an identifier of the first transmitter circuitry) modulated on the calibration signal. The range of angles may encompass the angle between the first transmitter circuitry and a known location (e.g., stored to memory 262 during production/factory calibration, etc.) of an object off which the calibration signal is to reflect. In the instances that second transmitter circuitry is detected coupled to the data bus, the first transmitter circuitry may modulate a millimeter wave radar burst to generate the compensated signals. In the instances that no second transmitter circuitry is detected as being coupled to the data bus, the first transmitter circuitry may generate the beamformed signals by modulating a millimeter wave radar burst. Data modulated onto the millimeter wave radar burst may be intended for receiver circuitry that is coupled to the data bus (e.g., to communicate data at a higher rate than supported by the bus).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A method comprising:
communicating, via bus interface circuitry of first transmitter circuitry, on a data bus to detect whether any second transmitter circuitry is coupled to the data bus;
in instances that second transmitter circuitry is detected as being coupled to the data bus:
determining, by the first transmitter circuitry, a phase offset between clock generation circuitry of the first transmitter circuitry and clock generation circuitry of the detected second transmitter circuitry;

determining, by the first transmitter circuitry, beamforming coefficients based on the determined phase offset; and transmitting, by the first transmitter circuitry via a first plurality of antenna elements and using the determined beamforming coefficients, signals that are phase coherent with other signals transmitted by the detected second transmitter circuitry via a second plurality of antenna elements.

2. The method of claim 1, wherein the determining the phase offset comprises the first transmitter circuitry:

transmitting, during a calibration period, calibration signals via the first plurality of antenna elements; and adjusting the beamforming coefficients during the transmitting the calibration signals such that a transmit antenna pattern of the calibration signal sweeps over a range of angles during the calibration period.

3. The method of claim 2 comprising generating, by the first transmitter circuitry, the calibration signals by modulating a millimeter wave radar burst.

4. The method of claim 3, wherein the determining the phase offset comprises the first transmitter circuitry receiving, via the data bus during the calibration period, an indication of a strength of a reflection of the calibration signals received by receiver circuitry coupled to the data bus.

5. The method of claim 4, comprising demodulating, by the receiver circuitry, the calibration signals to recover information modulated on the calibration signal.

6. The method of claim 2, wherein the range of angles encompasses the angle between the first transmitter circuitry and a known location of an object off which the calibration signal is to reflect.

7. The method of claim 1, wherein, in the instances that the second transmitter circuitry is detected coupled to the data bus, transmitting, by the first transmitter circuitry, the phase coherent signals by modulating a millimeter wave radar burst.

8. The method of claim 7, wherein data modulated onto the millimeter wave radar burst during the modulating is intended for receiver circuitry that is coupled to the data bus.

9. The method of claim 1, wherein, in instances that no second transmitter circuitry is detected as being coupled to the data bus, transmitting, by the first transmitter circuitry, phase coherent signals by modulating a millimeter wave radar burst.

10. The method of claim 9, wherein data modulated onto the millimeter wave radar burst during the modulating is intended for receiver circuitry that is coupled to the data bus.

11. A system comprising:

first transmitter circuitry that comprises bus interface circuitry and clock generation circuitry, and is operable to:

communicate, via the bus interface circuitry, on a data bus to detect whether any second transmitter circuitry is coupled to the data bus;

in instances that second transmitter circuitry is detected as being coupled to the data bus:

determine, by the first transmitter circuitry, a phase offset between clock generation circuitry of the first transmitter circuitry and clock generation circuitry of the detected second transmitter circuitry;

determine, by the first transmitter circuitry, beamforming coefficients based on the determined phase offset; and transmit, by the first transmitter circuitry via a first plurality of antenna elements and using the determined beamforming coefficients, signals that are phase coherent with other signals transmitted by the detected second transmitter circuitry via a second plurality of antenna elements.

12. The system of claim 11, wherein the determination of the phase offset comprises:

transmission, during a calibration period, of calibration signals via the first plurality of antenna elements; and adjustment of the beamforming coefficients during the transmission of the calibration signals such that a transmit antenna pattern of the calibration signal sweeps over a range of angles during the calibration period.

13. The system of claim 12 wherein the first transmitter circuitry is operable to modulate a millimeter wave radar burst to generate the calibration signals.

14. The system of claim 13, comprising receiver circuitry coupled to the data bus, wherein the first transmitter circuitry is operable to:

receive, via the data bus during the calibration period, an indication of a strength of a reflection of the calibration signals received by the receiver circuitry; and use the indication of strength of the reflection for the determination of the phase offset.

15. The system of claim 14, wherein the receiver circuitry is operable to demodulate the calibration signals to recover information modulated on the calibration signal.

16. The system of claim 12, wherein the range of angles encompasses the angle between the first transmitter circuitry and a known location of an object off which the calibration signal is to reflect.

17. The system of claim 11, wherein the first transmitter circuitry is operable to, in the instances that second transmitter circuitry is detected coupled to the data bus, modulate a millimeter wave radar burst to transmit the phase coherent signals.

18. The system of claim 17, wherein data modulated onto the millimeter wave radar burst is intended for receiver circuitry that is coupled to the data bus.

19. The system of claim 11, wherein the first transmitter circuitry is operable to, in instances that no second transmitter circuitry is detected as being coupled to the data bus, transmit phase coherent signals by modulating a millimeter wave radar burst.

20. The system of claim 19, wherein data modulated onto the millimeter wave radar burst is intended for receiver circuitry that is coupled to the data bus.

* * * * *